United States Patent
Nickels, Jr. et al.

(10) Patent No.: US 8,459,905 B2
(45) Date of Patent: *Jun. 11, 2013

(54) TOOL CHUCK WITH SLEEVE AND CLUTCH MECHANISM TO REMOVE OPERATOR VARIABILITY

(75) Inventors: Richard C. Nickels, Jr., Hampstead, MD (US); John E. Buck, Cockeysville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,378

(22) Filed: Oct. 14, 2011

(65) Prior Publication Data

US 2012/0025476 A1 Feb. 2, 2012

Related U.S. Application Data

(63) Continuation of application No. 12/654,027, filed on Dec. 8, 2009, now Pat. No. 8,038,156, which is a continuation of application No. 11/235,280, filed on Sep. 27, 2005, now Pat. No. 7,753,381.

(60) Provisional application No. 60/612,789, filed on Sep. 27, 2004.

(51) Int. Cl.
*B23B 31/26* (2006.01)
*B23B 31/38* (2006.01)
*B23B 33/00* (2006.01)

(52) U.S. Cl.
USPC ............... 408/9; 408/139; 408/141; 279/62; 279/125; 279/157; 279/902

(58) Field of Classification Search
USPC ............... 408/9, 124, 139–141; 279/60–63, 279/125, 134, 140, 144, 150, 157, 902
IPC ................... B32B 31/26,31/38, 33/00
See application file for complete search history.

(56) References Cited

U.S. PATENT DOCUMENTS

| | | | | |
|---|---|---|---|---|
| 3,325,166 A | * | 6/1967 | Haviland et al. | 279/63 |
| 3,545,776 A | * | 12/1970 | Haviland | 279/63 |
| 4,103,914 A | * | 8/1978 | Rohm | 279/4.07 |
| 4,317,578 A | * | 3/1982 | Welch | 279/60 |
| 4,323,324 A | * | 4/1982 | Eberhardt | 408/124 |
| 4,460,296 A | * | 7/1984 | Sivertson, Jr. | 408/124 |
| 4,463,960 A | * | 8/1984 | Walton | 279/60 |
| 4,498,682 A | * | 2/1985 | Glore | 279/61 |
| 4,536,113 A | * | 8/1985 | Hatfield | 409/234 |
| 4,621,820 A | * | 11/1986 | Rohm | 279/19.3 |
| 4,669,932 A | * | 6/1987 | Hartley | 408/239 R |
| 4,682,918 A | * | 7/1987 | Palm | 408/241 R |
| 4,848,779 A | * | 7/1989 | Wheeler et al. | 279/60 |
| 4,915,555 A | * | 4/1990 | Smothers | 408/240 |
| 4,958,840 A | * | 9/1990 | Palm | 279/62 |

(Continued)

*Primary Examiner* — Eric A Gates

(74) *Attorney, Agent, or Firm* — Kofi Schulterbrandt; Scott B. Markow; Adan Ayala

(57) ABSTRACT

A tool chuck may include a chuck body defining a longitudinal axis. A sleeve may be mounted on the chuck body for movement between a first axial position and a second axial position. A clutch part provided on the sleeve. The clutch part may engage with a cooperating clutch part when the sleeve is in the second axial position. The clutch part may have a working surface that faces in a direction perpendicular to the longitudinal axis.

8 Claims, 8 Drawing Sheets

U.S. PATENT DOCUMENTS

| | | | | |
|---|---|---|---|---|
| 5,011,343 A * | 4/1991 | Saban et al. | | 408/240 |
| 5,125,673 A * | 6/1992 | Huff et al. | | 279/60 |
| 5,195,760 A * | 3/1993 | Wheeler et al. | | 279/60 |
| 5,234,223 A * | 8/1993 | Sakamaki | | 279/61 |
| 5,375,857 A * | 12/1994 | Rohm | | 279/62 |
| 5,531,549 A * | 7/1996 | Fossella | | 408/240 |
| 5,624,125 A * | 4/1997 | Rohm | | 279/62 |
| 5,927,914 A * | 7/1999 | Mack et al. | | 408/240 |
| 5,988,653 A * | 11/1999 | Kuo | | 279/62 |
| 6,007,071 A * | 12/1999 | Middleton | | 279/62 |
| 6,073,939 A * | 6/2000 | Steadings et al. | | 279/62 |
| 6,173,972 B1 * | 1/2001 | Temple-Wilson et al. | | 279/62 |
| 7,328,904 B2 * | 2/2008 | Schell et al. | | 279/60 |
| 7,491,020 B2 * | 2/2009 | Gehret et al. | | 408/240 |
| 7,588,398 B2 * | 9/2009 | Puzio et al. | | 408/124 |
| 7,699,566 B2 * | 4/2010 | Nickels et al. | | 408/9 |
| 7,806,636 B2 * | 10/2010 | Puzio | | 408/124 |
| 2004/0055432 A1 * | 3/2004 | Sasaki | | 81/467 |
| 2006/0192351 A1 * | 8/2006 | Mack | | 279/62 |
| 2006/0233618 A1 * | 10/2006 | Puzio et al. | | 408/67 |
| 2006/0233621 A1 * | 10/2006 | Schell et al. | | 408/124 |
| 2009/0016834 A1 * | 1/2009 | Scrimshaw et al. | | 408/139 |

* cited by examiner

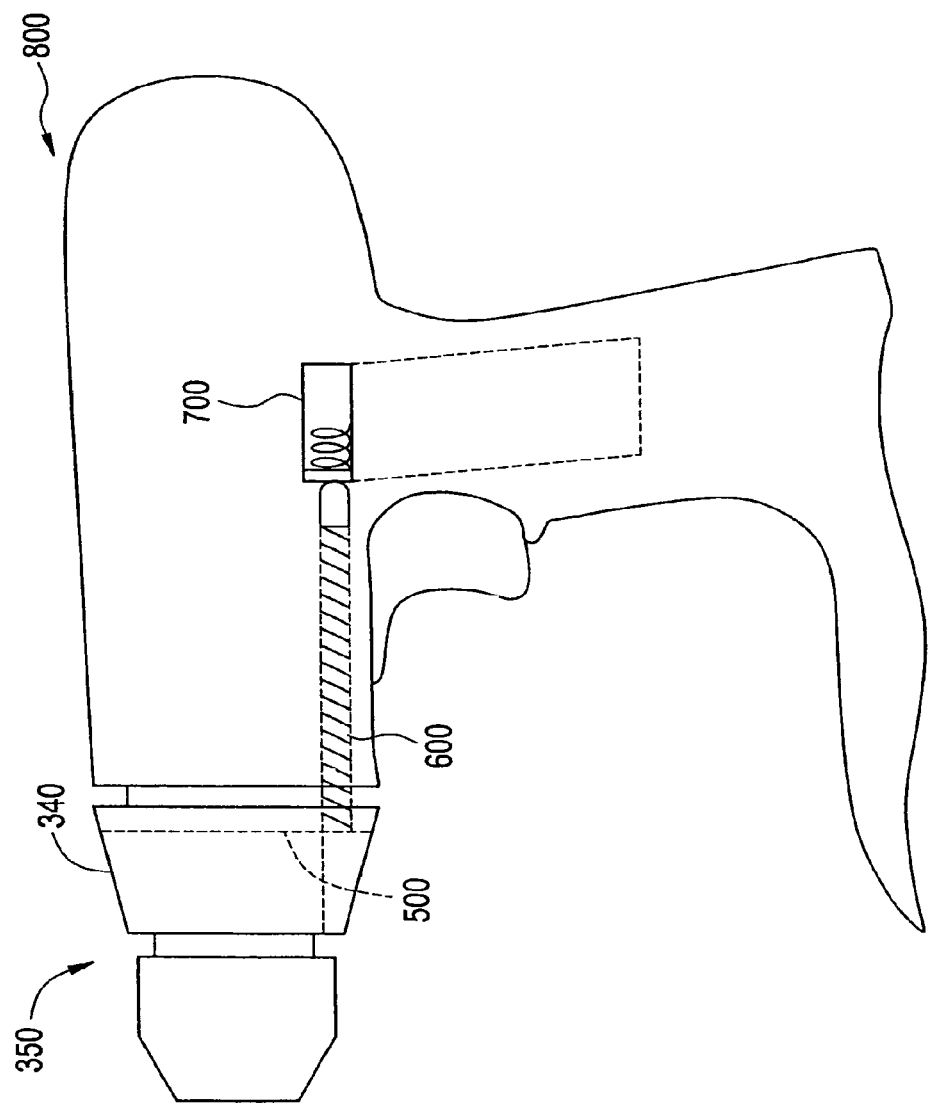

//(US 8,459,905 B2)

TOOL CHUCK WITH SLEEVE AND CLUTCH MECHANISM TO REMOVE OPERATOR VARIABILITY

CROSS REFERENCE TO RELATED APPLICATIONS

This is a continuation of U.S. patent application Ser. No. 12/654,027, filed Dec. 8, 2009, which is a continuation of U.S. patent application Ser. No. 11/235,280, filed Sep. 27, 2005, now pending, which claims priority under 35 USC §119 to U.S. Provisional Application No. 60/612,789 filed Sep. 27, 2004, the content of these applications are incorporated herein in their entirety by reference. This application claims priority to the applications cited above.

BACKGROUND

1. Field of the Invention

The present invention relates in general to tool chucks for attachment of accessories to power drivers, and more particularly to a tool chuck having chuck jaws that may be actuated with uniform torque and without operator variability.

2. Description of Related Art

A variety of tool chucks have been developed in which the chuck jaws may be opened and closed via a relative rotation between parts of the tool chuck. In some applications, the tool chuck may include a sleeve that is rotatable manually (with or without using a chuck key) to open and close the chuck jaws. In other applications, power from the power driver may be utilized to open and close the chuck jaws. Here, the tool chuck may be provided with a sleeve that is axially moveable to a position in which the sleeve is grounded (i.e., rotationally fixed) to the housing of the power driver. Thus, when the driver is powered up, a spindle of the driver (and consequently a chuck body) may rotate relative to the sleeve. The relative rotation between the spindle and the sleeve may open and close the chuck jaws.

Conventional keyless tool chucks are not without shortcomings. In particular, the tightening or loosening torque applied during a chuck actuating process may vary depending on factors such as, for example, the firmness with which the operator manipulates the sleeve. On the one hand, if an operator manipulates the sleeve with a relatively high force, then a relatively high torque may be applied during the chuck actuating process. On the other hand, if an operator manipulates the sleeve with a relatively low force, then a relatively low torque may be applied during the chuck actuating process.

The inconsistent application of torque may lead to problems such as under tightening and over tightening of the tool chuck. When the tool chuck is under tightened, the accessory may slip relative to (and even inadvertently fall from) the tool chuck. When the tool chuck is over tightened, it may be difficult to loosen the tool chuck to remove the accessory. Also, high speed impacts between transmission elements of the power driver may occur when the chuck jaws bottom out on the accessory (when tightening) or when the chuck jaws reach the full limit of travel (when loosening). In conventional devices, such high speed impacts may damage the transmission elements since the torque applied during the chuck actuating process may be unlimited.

SUMMARY

In an example, non-limiting embodiment, a tool chuck may include a chuck body defining a longitudinal axis. A sleeve may be mounted on the chuck body for movement between a first axial position and a second axial position. The sleeve may include a clutch part that engages with a cooperating clutch part when the sleeve is in the second axial position. The clutch part may have a working surface that faces in a direction perpendicular to the longitudinal axis.

In another example, non-limiting embodiment, a tool chuck may include a chuck body defining a longitudinal axis. A first sleeve may be mounted on the chuck body. A second sleeve may be mounted on the chuck body. The second sleeve may support a clutch part. The second sleeve may be moveable relative to the first sleeve between a first axial position in which the first and the second sleeves are rotatable with the chuck body, and a second axial position in which the clutch part engages with a cooperating clutch part.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

BRIEF DESCRIPTION OF THE DRAWINGS

Example embodiments of the present invention will become more fully understood from the detailed description below and the accompanying drawings, wherein like elements are represented by like reference numerals, which are given by way of illustration only and thus are not limiting of the present invention.

FIG. 16 is a partial schematic illustration of a tool chuck according to another example, non-limiting embodiment of the present invention.

DETAILED DESCRIPTION OF EXAMPLE, NON-LIMITING EMBODIMENTS

I. Example Embodiment Depicted in FIGS. 1-4

Figure 1:
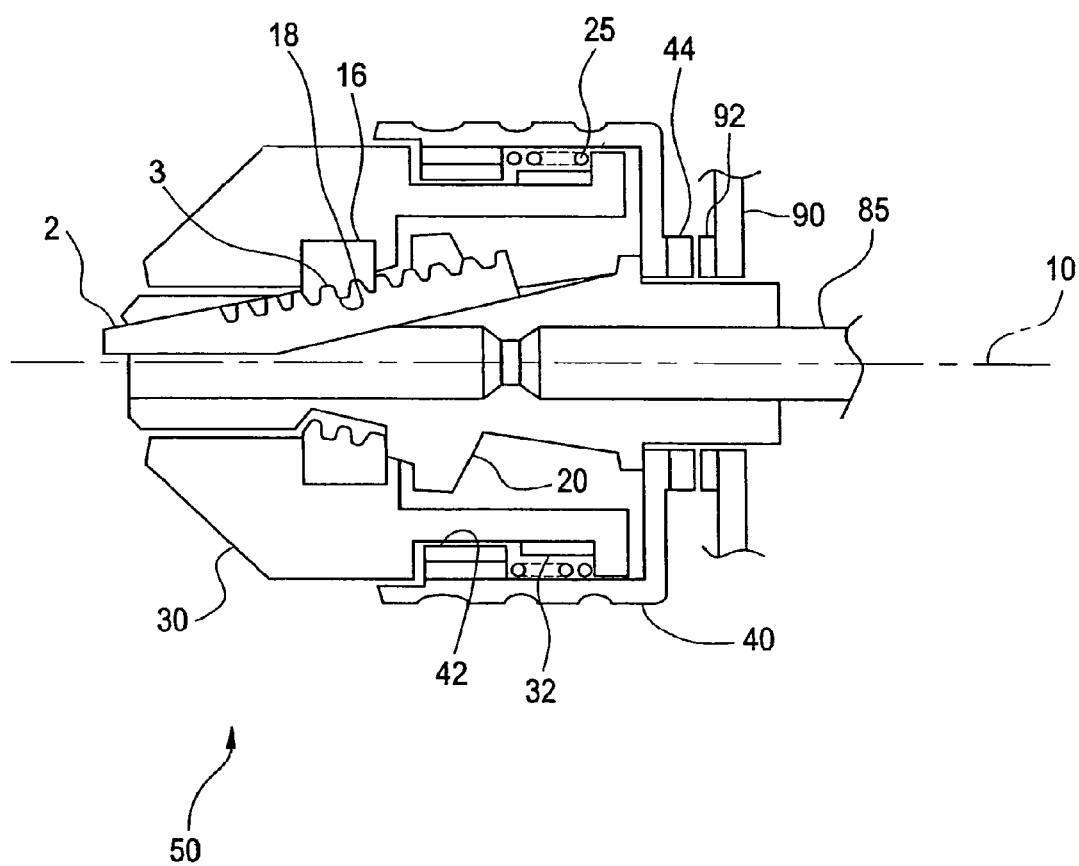
FIG. 1 is a schematic illustration of a tool chuck according to an example, non-limiting embodiment of the present invention.

FIG. 1 shows an example, non-limiting embodiment of a tool chuck 50 that may be actuated with uniform torque and without operator variability. The tool chuck 50 may be provided on a power driver (e.g., a drill) for holding an accessory (e.g., a drill bit). It will be appreciated, however, that the tool chuck 50 may be suitably implemented on a variety of power drivers (other than drills) for holding a variety of accessories (other than drill bits).

A. The Structure:

With reference to FIG. 1, the tool chuck 50 may include a chuck body 20. The rear end of the chuck body 20 may be fixedly mounted on a spindle 85 of a power driver. The forward end of the chuck body 20 may have passageways that slidably support a plurality of chuck jaws 2. The chuck jaws 2 may be inclined so that respective forward ends of the chuck jaws 2 converge toward an axis 10 of the chuck body 20. The chuck jaws 2 may have respective radially outward facing threads 3. For clarity of illustration, only a single chuck jaw 2 is depicted in FIG. 1.

In this example embodiment, the chuck jaws 2 may be characterized as "threaded" chuck jaws. That is, the chuck jaws 2 may be actuated (i.e., advanced and/or retracted) via the radially outward facing threads 3 interacting with radially inward facing threads 18 of a nut 16. However, the present invention is not limited in this regard. For example, "pusher" jaws may be suitably implemented and supported by the chuck body. Pusher jaws are well known in this art, and therefore a detailed discussion of the same is omitted. It will be appreciated that the invention may be implemented with a variety chuck jaw types that may be opened and closed through a relative rotation between tool chuck parts (e.g., a nut and a chuck body).

The chuck body 20 may support a front sleeve 30 and a rear sleeve 40. The front sleeve 30 and the rear sleeve 40 may be rotatable relative to each other. As will be discussed in more detail below, a clutch mechanism (inclusive of two cooperating clutch parts 32, 42) may be provided between the front sleeve 30 and the rear sleeve 40. The clutch mechanism may rotationally lock the front sleeve 30 and the rear sleeve 40 together up to a predetermined torque threshold. Once the predetermined torque threshold is reached, the clutch mechanism may give way (or slip) to limit the torque that may be applied during the chuck actuating process. Further, the clutch mechanism may be designed so that the predetermined threshold for tightening the tool chuck may be less than the predetermined threshold for loosening the tool chuck.

The front sleeve 30 may be supported so that it is axially fixed to the chuck body 20 and rotatable relative to the chuck body 20. The front sleeve 30 may fixedly carry the nut 16. In this example embodiment, the front sleeve 30 and the nut 16 may be separate and distinct elements to facilitate assembly of the tool chuck 50. It will be appreciated, however, that the front sleeve 30 and the nut 16 may be of a unitary, one-piece construction. The rear end of the front sleeve 30 may include the clutch part 32.

The rear sleeve 40 may be supported so that it is axially moveable relative to the chuck body 20 (and thus the front sleeve 30) between the axial forward position depicted in FIG. 1 and an axial rearward position. The rear sleeve 40 may also be rotatable relative to the chuck body 20. The forward end of the rear sleeve 40 may include the clutch part 42. The clutch part 42 may interact with the clutch part 32 of the front sleeve 30. The rear end of the rear sleeve 40 may include lugs 44. The lugs 44 may interact with cooperating lugs 92 of the power driver housing 90.

A compression spring 25 may be captured between the front sleeve 30 and the rear sleeve 40. The compression spring 25 may influence the rear sleeve 40 to the axial forward position depicted in FIG. 1.

Figure 2:
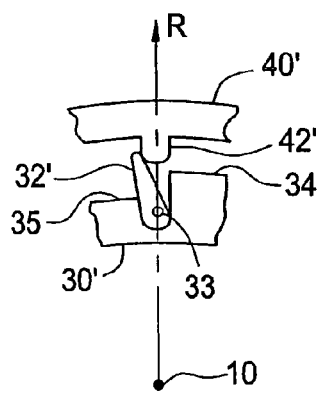
FIGS. 2-4 are schematic illustrations of example clutch mechanisms that may be implemented in the tool chuck of FIG. 1.
Figure 3:
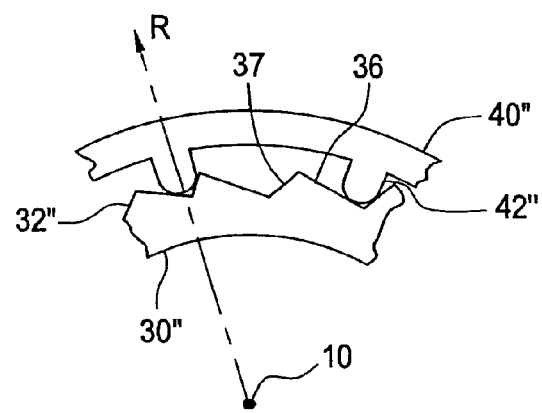
Figure 4:
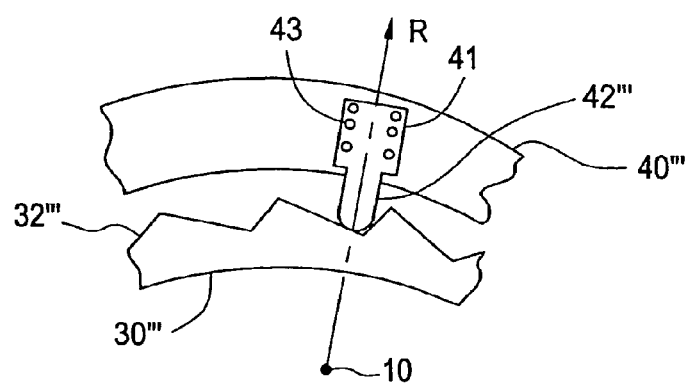

B. The Clutch Mechanism:

The structural and functional aspects of the clutch mechanism will become more apparent with reference to FIGS. 2-4, which are partial sectional views (taken perpendicular to the axis 10) of example, non-limiting embodiments of the cooperating clutch parts that may be suitably implemented in the tool chuck 50 of FIG. 1. In FIGS. 2-4, the rear sleeve is depicted in the axial rearward position so that the clutch parts may be operatively engaged. In this condition, one clutch part may be located radially inward of the other clutch part.

The cooperating clutch parts may include respective working surfaces. In this specification, the term "working surface" refers to the surface of the clutch part that may frictionally engage with the working surface of the cooperating clutch part. In FIGS. 2-4, the working surfaces of the clutch parts may face in directions that are perpendicular to the axis 10 of the tool chuck. That is, as shown in FIGS. 2-4, the working surfaces of the various clutch parts may face in directions that are parallel to the plane of the drawing sheet, while the axis 10 is perpendicular to the plane of the drawing sheet.

B(1). The Example Clutch Mechanism of FIG. 2:

As shown in FIG. 2, the clutch part of the front sleeve 30' may be in the form of an arm 32', and the clutch part of the rear sleeve 40' may be in the form of a detent 42'. The arm 32' may be mounted on the front sleeve 30' via a pin 33 so that the arm 32' is pivotable about the pin 33. The front sleeve 30' may also include two shoulders 34, 35 flanking the arm 32' and limiting the pivot action of the arm 32' about the pin 33.

During a chuck actuating process, and when the tool chuck 50 is not fully opened or closed (e.g., while the chuck jaws are still opening or closing), the arm 32' may abut against the detent 42', which in turn may influence the arm 32' to pivot about the pin 33 and abut against one of the shoulders 34, 35. At this time, the front sleeve 30' and the rear sleeve 40' may be rotationally locked together. When the tool chuck fully closes (with or without an inserted accessory) or fully opens, a rotational force applied by the arm 32' to the detent 42' may increase. Here, the rotational force may increase to a threshold at which the detent 42' may be driven in a radial outward direction (causing the rear sleeve 40' to elastically deform) so that the arm 32' may slide underneath and past the detent 42'. In this way, the clutch mechanism may give way (or slip), thereby limiting the torque that may be applied during the chuck actuating process.

It will be appreciated that the magnitude of the rotational force necessary to drive the detent 42' in a radial outward direction may be affected by, for example, the elastic properties of the material from which the rear sleeve 40' is fabricated and the degree to which the working surface of the arm 32' is inclined (or slanted) relative to a radial reference line R extending from the axis 10. Consider the incline of the working surface; the smaller the angle between the working surface and the radial reference line R, the greater the rotational force necessary to make the clutch mechanism slip. Put differently, the steeper the working surface relative to a circumferential reference line (which would be perpendicular to the radial reference line R), the greater the rotational force necessary to make the clutch mechanism slip.

As shown in FIG. 2, the shoulder 34 of the front sleeve 30' may be higher (in a radial direction) than the shoulder 35. Thus, as compared to the shoulder 34, the shoulder 35 may allow the arm 32' to pivot about the pin 33 to a greater extent (i.e., through a greater angular displacement) from the radial reference line R. Thus, when the arm 32' abuts against the shoulder 35 (as shown in FIG. 2), the working surface of the arm 32' may be inclined (relative to the radial reference line R) to a greater degree than when the arm 32' abuts against the shoulder 34. In this way, the rotational force (or torque threshold) required to make the clutch mechanism slip in a first direction (i.e., when the detent 42' slides over the arm 32' abutted against the shoulder 35, as shown in FIG. 2) may be less than the rotational force (or torque threshold) required to make the clutch mechanism slip in a second direction (i.e., when the detent 42' slides over the arm 32' abutted against the should 34). This torque threshold differential may be suitably implemented so that a predetermined torque threshold for the chuck tightening process may be less than a predetermined torque threshold for the chuck loosening process.

Numerous modifications of the example clutch mechanism depicted in FIG. 2 may be readily apparent to those skilled in this art. For example, rather than being pivotable, the arm 32' may be cantilevered from the front sleeve 30' and elastically deformable. Here, the detent 42' may elastically bend the cantilevered arm 32' against one of the shoulders 34, 35 so that the detent 42' may slide over the cantilevered arm 32'. Since the shoulder 34 may be higher (in a radial direction) than the shoulder 35, the shoulder 35 may provide less support for the cantilevered arm 32'. In this way, the rotational force (or torque threshold) required to make the clutch mechanism slip in a first direction (i.e., when the detent 42' elastically bends the cantilevered arm 32' toward the shoulder 35, as shown in FIG. 2) may be less than the rotational force (or torque threshold) required to make the clutch mechanism slip in a second direction (i.e., when the detent 42' elastically bends the cantilevered arm 32' toward the shoulder 34).

B(2). The Example Clutch Mechanism of FIG. 3:

As shown in FIG. 3, the clutch part of the front sleeve 30" may be in the form of a raised feature 32", and the clutch part of the rear sleeve 40" may be in the form of a detent 42". The raised feature 32" may include two ramps 36, 37.

During a chuck actuating process, and when the tool chuck 50 is not fully opened or closed, the raised feature 32" may abut against the detent 42" so that the front sleeve 30" and the rear sleeve 40" may be rotationally locked together. When the tool chuck fully closes or fully opens, a rotational force applied by the raised feature 32" to the detent 42" may increase to a threshold at which the detent 42" may be driven in a radial outward direction (causing the rear sleeve 40" to elastically deform) so that the raised feature 32" may slide underneath and past the detent 42".

As shown in FIG. 3, a working surface of the ramp 36 may be inclined (relative to the radial reference line R) to a greater degree than a working surface of the ramp 37. In this way, the rotational force (or threshold torque) required to make the clutch mechanism slip in a first direction (i.e., when the detent 42" is driven in a radial outward direction via the working surface of the ramp 36) may be less than the rotational force (or threshold torque) required to make the clutch mechanism slip in a second direction (i.e., when the detent 42" is driven in a radial outward direction via the working surface of the ramp 37). This threshold torque differential may be suitably implemented so that a predetermined torque threshold for the chuck tightening process may be less than a predetermined threshold for the chuck loosening process.

B(3). The Example Clutch Mechanism of FIG. 4:

The example clutch mechanism of FIG. 4 is somewhat similar to the one depicted in FIG. 3 to the extent that the clutch part of the front sleeve 30''' may be in the form of a raised feature 32''' including two ramps. However, there are several notable differences.

As shown in FIG. 4, the clutch part of the rear sleeve 40''' may be in the form of a detent 42''' that may be biased in a radial inward direction by a compression spring 43. The compression spring 43 and the detent 42''' may be received in a pocket 41 of the rear sleeve 40'''.

During a chuck actuating process, and when the tool chuck 50 is not fully opened or closed, the raised feature 32''' may abut against the protrusion 42''' so that the front sleeve 30''' and the rear sleeve 40''' may be rotationally locked together. When the tool chuck fully closes or fully opens, a rotational force applied by the raised feature 32''' to the protrusion 42''' may increase to a threshold at which the protrusion 42''' may be driven in a radial outward direction (and into the pocket 41) against the influence of the compression spring 43 so that the raised feature 32''' may slide underneath and past the detent 42'''. The compression spring 43 may then influence the detent 42''' to return to a radial inward position (as shown in FIG. 4). In this example embodiment, the clutch mechanism may slip without the rear sleeve 40''' experiencing any elastic deformation.

As in the previous embodiments, a threshold torque differential may be suitably implemented so that a predetermined torque threshold for the chuck tightening process may be less than a predetermined threshold for the chuck loosening process.

C. The Operation:

The tool chuck 50 may operate differently depending on the axial position of the rear sleeve 40.

When the rear sleeve 40 is in the axial forward position, as shown in FIG. 1, the power driver may be operated in a normal operating mode. Here, the rear sleeve 40 may be rotatable relative to the front sleeve 30 since the clutch parts 32, 42 may be disengaged (i.e., the clutch mechanism is inactive). The rear sleeve 40 may also be rotatable relative to the housing 90 of the driver since the lugs 44, 92 may be disengaged.

When the driver is powered up, the spindle 85 may rotationally drive the chuck body 20, which in turn may rotationally drive the chuck jaws 2. The chuck jaws 2 may rotate together with the nut 16, the front sleeve 30, and the rear sleeve 40 due to friction between the component parts. Thus, the entire tool chuck 50 may rotate together as a single unit.

An operator may push the rear sleeve 40 to the axial rearward position and with sufficient force to compress the spring 25 so that the power driver may be operated in a chuck actuating mode. Here, the front sleeve 30 and the rear sleeve 40 may be rotationally locked together up to a predetermined torque threshold via the engagement of and interaction between the clutch parts 32, 42 (i.e., the clutch mechanism is active). Also, the rear sleeve 40 and the housing 90 may be rotationally locked together via the engagement of the lugs 44, 92.

When the driver is powered up, the spindle 85 may rotationally drive the chuck body 20, which may rotate together with the chuck jaws 2. The chuck body 20 (and thus the chuck jaws 2) may rotate relative to the nut 16 and the front sleeve 30. This is because the front sleeve 30 may remain rotationally locked to rear sleeve 40 (via the clutch mechanism), and the rear sleeve 40 may remain rotationally locked to the housing 90 (via the lugs 44, 92). The relative rotation between the nut 16 and the chuck body 20 (and thus the chuck jaws 2) may drive the chuck jaws 2 opened or closed (depending on the rotation direction of the spindle 85) by virtue of the interaction between the radially inward facing threads 18 and the radially outward facing threads 3.

As the tool chuck 50 reaches a fully opened or closed position, the nut 16 may become tightened onto the jaw threads 3. At this time, increased rotational forces may be transmitted from the chuck body 20 (and the chuck jaws 2), through the nut 16, and to the clutch part 32. The rotational force may increase to a threshold at which the clutch mechanism may give way (or slip). In this way, the clutch mechanism may limit the torque that may be applied during the chuck actuating process.

It will be appreciated that the driver may be powered up in opposite rotational directions to respectively tighten or loosen the tool chuck 50. In this regard, and with reference to FIGS. 2-4, the tool chuck 50 may be designed so that when tightened, the clutch mechanism may slip in a direction so that the front sleeve rotates clockwise relative to the rear sleeve. For example, the designer will appreciate that the threads 3 of the chuck jaws 2 and the threads 18 of the nut 16 may be left-handed threads or right-handed threads to achieve the desired chuck jaw actuation. In this way, a predetermined torque threshold for the chuck lightening process may be less than a predetermined torque threshold for the chuck loosening process. Once the clutch mechanism slips, the operator may release the rear sleeve 40, allowing the spring 25 to return the rear sleeve 40 to the forward axial position.

II. Example Embodiment Depicted in FIGS. 5-9

FIGS. 5-9 show another example, non-limiting embodiment of a tool chuck 150 that may be actuated with uniform torque and without operator variability. In this example embodiment, the clutch mechanism may be provided between the rear sleeve and the power driver housing.

Figure 5:
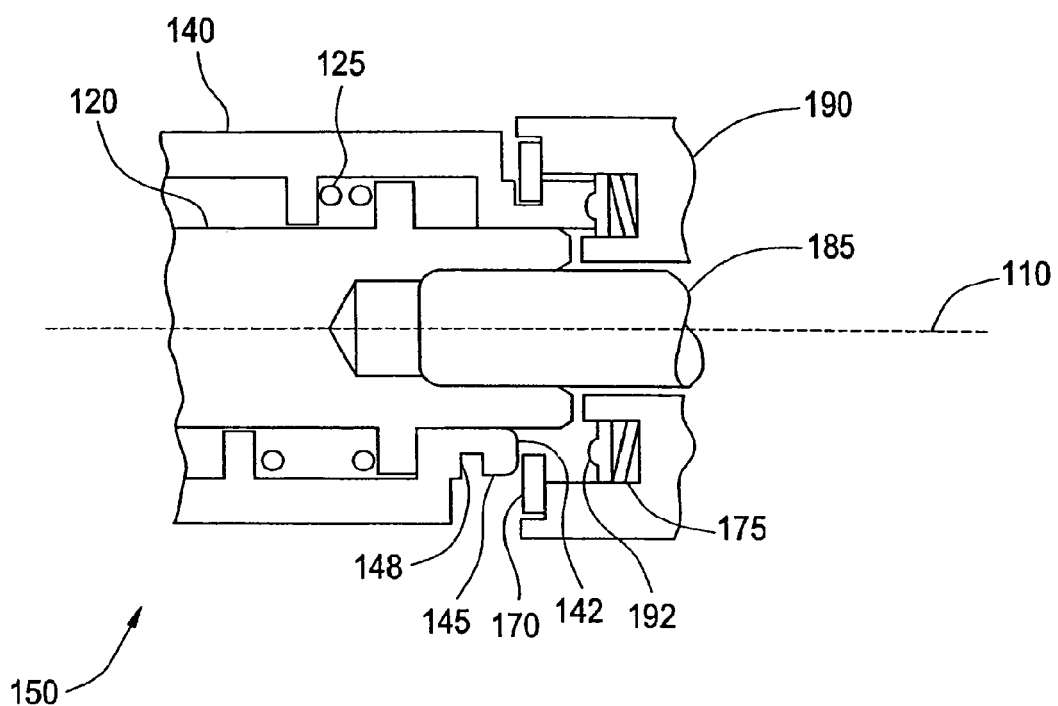
FIG. 5 is a schematic illustration of a tool chuck according to another example, non-limiting embodiment of the present invention.

A. The Structure:

With reference to FIG. 5, the tool chuck 150 may include a chuck body 120. The rear end of the chuck body 120 may be fixedly mounted on a spindle 185 of a power driver. The forward end of the chuck body 120 may have passageways that slidably support a plurality of chuck jaws (not illustrated). The chuck jaws and how they interact with the nut (and the forward sleeve) may be similar to that of the previous embodiment. Accordingly, a detailed discussion of the same is omitted. As in the previous embodiment, it will be appreciated that the invention may be implemented with a variety chuck jaw types that may be opened and closed through a relative rotation between tool chuck parts.

The chuck body 120 may support the front sleeve (not illustrated) and a rear sleeve 140. The front sleeve and the rear sleeve 140 may be coupled together so that the rear sleeve 140 is axially moveable relative to the front sleeve and rotationally fixed to the front sleeve. By way of example only, and not as a limitation of the invention, the front sleeve may include a longitudinal spline that is received by a cooperating feature provided on the rear sleeve 140. It will be appreciated that numerous and varied couplings may be suitably implemented as is well known in this art.

The rear sleeve 140 may be supported so that it is axially moveable relative to the chuck body 120 (and thus the front sleeve) between an axial forward position and an axial rearward position. In FIG. 5, the top half of the tool chuck 150 (i.e., above the axis 110) is illustrated with the rear sleeve 140 in the axial rearward position, while the bottom half of the tool chuck 150 (i.e., below the axis 110) is illustrated with the rear sleeve 140 in the axial forward position. A compression spring 125 may be captured between the rear sleeve 140 and the chuck body 120. The compression spring 125 may influence the rear sleeve 140 to the axial forward position.

As will be discussed in more detail below, a clutch mechanism (inclusive of two cooperating clutch parts 142, 192) may be provided between the rear sleeve 140 and the housing 190 of the driver. The clutch mechanism may rotationally lock the rear sleeve 140 and the housing 190 together up to a predetermined torque threshold. Once the predetermined torque threshold is reached, the clutch mechanism may give way (or slip) to limit the torque that may be applied during the chuck actuating process.

The rear end of the rear sleeve 140 may include legs 145 that project in an axial rearward direction. Each leg 145 may include an intermediate section in which a groove 148 is provided. Each groove 148 may have a bottom surface facing in a radial outward direction. Each leg 145 may also have a distal end supporting the clutch part 142.

The housing 190 may fixedly support a retainer 170. The housing 190 may also support the clutch part 192 that may interact with the clutch part 142 of the rear sleeve 140. The clutch part 192 may be rotationally fixed to the housing 190 and axially moveable relative to the housing 190. To this end, the housing 190 and the clutch part 192 may be spline coupled together. Such spline couplings (as well as other alternative couplings) are well known in this art, and therefore a detailed description of the same is omitted.

The clutch part 192 may be biased in an axial forward direction by a spring mechanism 175. The spring mechanism 175 depicted in FIG. 5 may be in the form of a wave plate. However, the invention is not limited in this regard and other conventional spring mechanisms may be suitably implemented.

B. The Clutch Mechanism:

The structural and functional aspects of the clutch mechanism will become more apparent with reference to FIGS. 6-9, which show example, non-limiting clutch parts that may be suitably implemented in the tool chuck 150 of FIG. 5.

Figure 6:
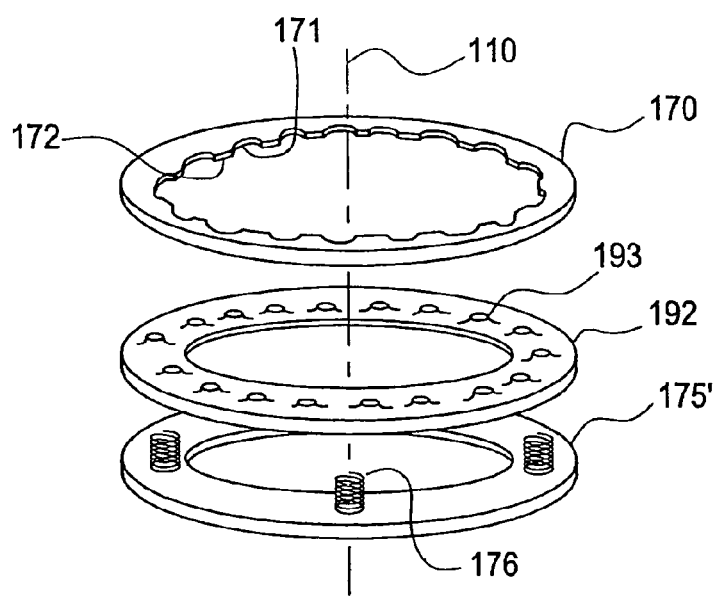
FIG. 6 is an exploded perspective view of example component parts that may be mounted in the driver housing depicted in FIG. 5.

FIG. 6 is an exploded perspective view of the retainer 170, the clutch part 192, and the spring mechanism 175', all of which may be mounted in the housing 190. The retainer 170 may include a radial inward edge along which notches 171 and tabs 172 may be alternately arranged. The retainer 170 may interact with the legs 145 of the rear sleeve 140 as follows. The notches 171 may accommodate an axial movement of the legs 145. That is, when the rear sleeve 140 is moved to (and from) the axial rearward position, the legs 145 may slide in an axial direction through the notches 171 of the retainer 170. The tabs 172 may enter into the grooves 148 of the legs 145 when the rear sleeve 140 (positioned in the axial rearward position) is rotated. In this way, the tabs 172 of the retainer 170 may retain the rear sleeve 140 in the axial rearward position.

In this example embodiment, the clutch part 192 may have one side provided with a plurality of detents 193. The detents 193 may project in an axial direction from the clutch part 192. The detents 193 may interact with the clutch part 142 of the rear sleeve 140. In FIG. 6, the spring mechanism 175' may be in the form of a body having one side that supports a plurality of compression springs 176. The compression springs 176 may abut against the clutch part 192. The invention is not limited to a particular spring mechanism. For example, as noted above, the spring mechanism may be in the form of a wave plate (as shown in FIG. 5) or some other conventional spring mechanism.

Figure 7:
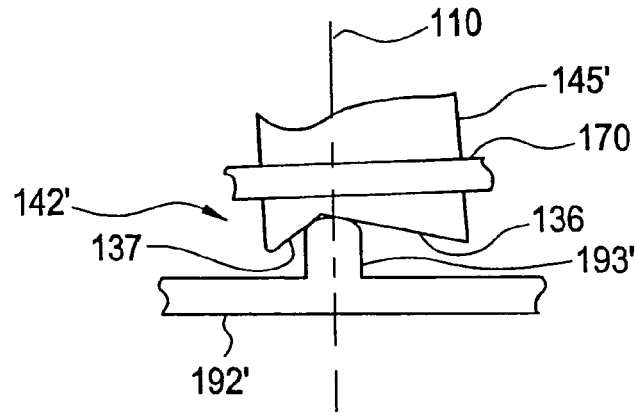
FIGS. 7-9 are schematic illustrations of example clutch mechanisms that may be implemented in the tool chuck of FIG. 5.
Figure 8:
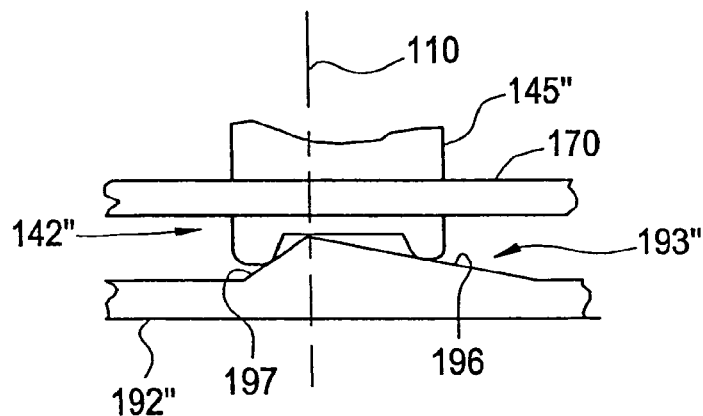
Figure 9:
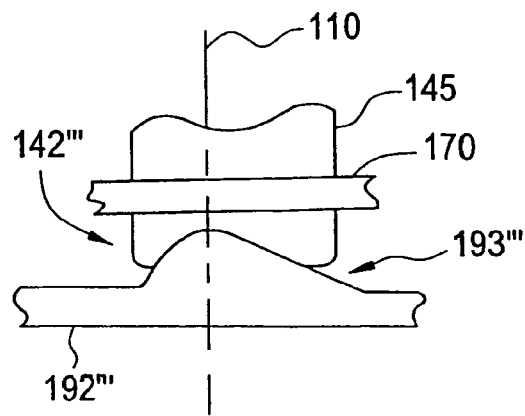

In FIGS. 7-9, the rear sleeve is depicted in the axial rearward position so that the clutch parts may be operatively engaged. Further, the tabs 172 may be positioned in the grooves 148 of the legs 145 so that the retainer 170 may retain the rear sleeve 140 in the axial rearward position (against the influence of the spring mechanism 175 and the compression spring 125).

B(1). The Example Clutch Mechanism of FIG. 7:

As shown in FIG. 7, the clutch part of the rear sleeve may be in the form of a raised feature 142' provided on the distal end of the leg 145'. The raised feature 142' may include two ramps 136, 137. The raised feature 142' may interact with the detent 193' of the clutch part 192' mounted in the housing.

During a chuck actuating process, and when the tool chuck 150 is not fully opened or closed (e.g., while the chuck jaws are still opening or closing), the raised feature 142' may abut against the detent 193' so that the rear sleeve and the housing may be rotationally locked together. When the tool chuck fully closes (with or without an inserted accessory) or fully opens, a rotational force applied by the raised feature 142' to the detent 193' may increase. Here, the rotational force may increase to a threshold at which the detent 193' (together with the clutch part 192') may be driven in an axial rearward direction (against the influence of the spring mechanism) so that the raised feature 142' may slide across and past the detent 193'. In this way, the clutch mechanism may give way (or slip), thereby limiting the torque that may be applied during the chuck actuating process.

It will be appreciated that the magnitude of the rotational force necessary to drive the detent 193' in the axial rearward direction may be affected by, for example, the strength of the spring mechanism 175 and the degree to which the working surface of the raised feature 142' is inclined (or slanted) relative to the axis 110. The smaller the angle between the working surface and the axis 110, the greater the rotational force necessary to make the clutch mechanism slip.

As shown in FIG. 7, a working surface of the ramp 136 may be inclined (relative to the axis 110) to a greater degree than a working surface of the ramp 137. In this way, the rotational force (or threshold torque) required to make the clutch mechanism slip in a first direction (i.e., when the detent 193' is driven in the axial rearward direction via the working surface of the ramp 136) may be less than the rotational force (or threshold torque) required to make the clutch mechanism slip in a second direction (i.e., when the detent 193' is driven in the axial rearward direction via the working surface of the ramp 137). This threshold torque differential may be suitably implemented so that a predetermined torque threshold for the chuck tightening process may be less than a predetermined threshold for the chuck loosening process.

B(2). The Example Clutch Mechanism of FIG. 8:

As shown in FIG. 8, the clutch part of the rear sleeve may be in the form of a raised feature 142" provided on the distal end of the leg 145". The raised feature 142" may include two shoulders. The detent 193" of the clutch part 192" mounted in the housing may include two ramps 196, 197.

During a chuck actuating process, and when the tool chuck 150 is not fully opened or closed, the raised feature 142" may abut against the detent 193" so that the rear sleeve and the housing may be rotationally locked together. When the tool chuck fully closes or fully opens, a rotational force applied by the raised feature 142" to the detent 193" may increase. Here, the rotational force may increase to a threshold at which the detent 193" may be driven in an axial rearward direction (against the influence of the spring mechanism) so that the raised feature 142" may slide across and past the detent 193". In this way, the clutch mechanism may give way (or slip), thereby limiting the torque that may be applied during the chuck actuating process.

As shown in FIG. 8, a working surface of the ramp 196 may be inclined (relative to the axis 110) to a lesser degree than a working surface of the ramp 197. In this way, the rotational force (or threshold torque) required to make the clutch mechanism slip in a first direction (i.e., when the detent 193" is driven in the axial rearward direction via the working surface of the ramp 196) may be less than the rotational force (or threshold torque) required to make the clutch mechanism slip in a second direction (i.e., when the detent 193" is driven in the axial rearward direction via the working surface of the ramp 197). This threshold torque differential may be suitably implemented so that a predetermined torque threshold for the chuck tightening process may be less than a predetermined threshold for the chuck loosening process.

B(3). The Example Clutch Mechanism of FIG. 9:

The example clutch mechanism of FIG. 9 is somewhat similar to the examples depicted in FIGS. 7 and 8. However, there are some notable differences.

As shown in FIG. 9, the cooperating clutch parts 142''', 192''' may have working surfaces with complementary profiles. Also, the working surfaces of the clutch parts may be curved. The interaction between the clutch parts 142''', 192''' may be similar to that described above with respect to the examples illustrated in FIGS. 7 and 8.

C. The Operation:

The tool chuck 150 may operate differently depending on the axial position of the rear sleeve 140.

When the rear sleeve 140 is in the axial forward position, as shown in the bottom half of FIG. 5 (i.e., below the axis 110), the power driver may be operated in a normal operating mode. Here, the rear sleeve 140 may be rotatable relative to the housing 190 since the clutch parts 142, 192 may be disengaged (i.e., the clutch mechanism is inactive).

When the driver is powered up, the spindle 185 may rotationally drive the chuck body 120, which in turn may rotationally drive the chuck jaws. The chuck jaws may rotate together with the nut, the front sleeve, and the rear sleeve 140. Thus, the entire tool chuck 150 may rotate together as a single unit.

To achieve a chuck actuating mode, an operator may push the rear sleeve 140 to the axial rearward position and with sufficient force to compress the spring 125. As the rear sleeve 140 moves in the axial rearward direction (relative to the front sleeve, the chuck body 120, and the housing 190), the legs 145 may pass through the notches 171 of the retainer 170. The legs 145 may penetrate axially through the notches 171 by a sufficient distance so that the clutch parts 142 of the legs may press the clutch part 192 of the housing 190 in an axial direction against the influence of the spring mechanism 175.

The operator may then turn the rear sleeve 140 so that the tabs 172 of the retainer 170 may enter into the grooves 148 of the legs 145, as shown in the top half of FIG. 5 (i.e., above the axis 110). At this time, the operator may release the rear sleeve 140, which may remain in the axial rearward position by virtue of the tabs 172 being inserted into the slots 148. In this condition, the rear sleeve 140 and the housing 190 may be rotationally locked together up to a predetermined torque threshold via the engagement of and interaction between the clutch parts 142, 192 (i.e., the clutch mechanism is active).

When the driver is powered up, the spindle 185 may rotationally drive the chuck body 120, which may rotate together with the chuck jaws. The chuck body 120 (and thus the chuck jaws) may rotate relative to the nut and the front sleeve. This is because the front sleeve may remain rotationally locked to the rear sleeve 140 (via the spline coupling), which in turn may remain rotationally locked to the housing 190 (via the clutch mechanism). The relative rotation between the nut and the chuck body 120 (and thus the chuck jaws) may drive the chuck jaws opened or closed (depending on the rotation direction of the spindle 185).

As the tool chuck 150 reaches a fully opened or closed position, the nut may become tightened onto the chuck jaws. At this time, increased rotational forces may be transmitted from the chuck body 120 (and the chuck jaws), through the nut and the front sleeve, and to the clutch part 142. The rotational force may increase to a threshold at which the clutch mechanism may give way (or slip). In this way, the clutch mechanism may limit the torque that may be applied during the chuck actuating process.

It will be appreciated that the driver may be powered up in opposite rotational directions to respectively tighten or loosen the tool chuck 150. In this regard, and with reference to FIGS. 7-9, the tool chuck 150 may be designed so that when tightened, the clutch mechanism may slip in a direction so that the legs 145', 145", 145''' may move to the left relative to the retainer 170. In this way, a predetermined torque threshold for the chuck tightening process may be less than a predetermined torque threshold for the chuck loosening process.

When the clutch mechanism slips, the rear sleeve 140 may rotate relative to the housing 190 (and thus the retainer 170). During this relative rotation, the legs 145 may enter into the notches 171 of the retainer 170, and at the same time the tabs 172 of the retainer 170 may slide through and exit from the grooves 148 of the legs 145. Once the tabs 172 exit from the grooves 148, the spring 125 may return the rear sleeve 140 to the axial forward position. This may give the operator an audible and/or visual indication that the chuck actuating process is complete.

III. Example Embodiment Depicted in FIGS. 10-15

FIGS. 10-15 show another example, non-limiting embodiment of a tool chuck 250 that may be actuated with uniform torque and without operator variability. In this example embodiment, the clutch mechanism may be provided between an outer sleeve and the power driver housing.

Figure 10:
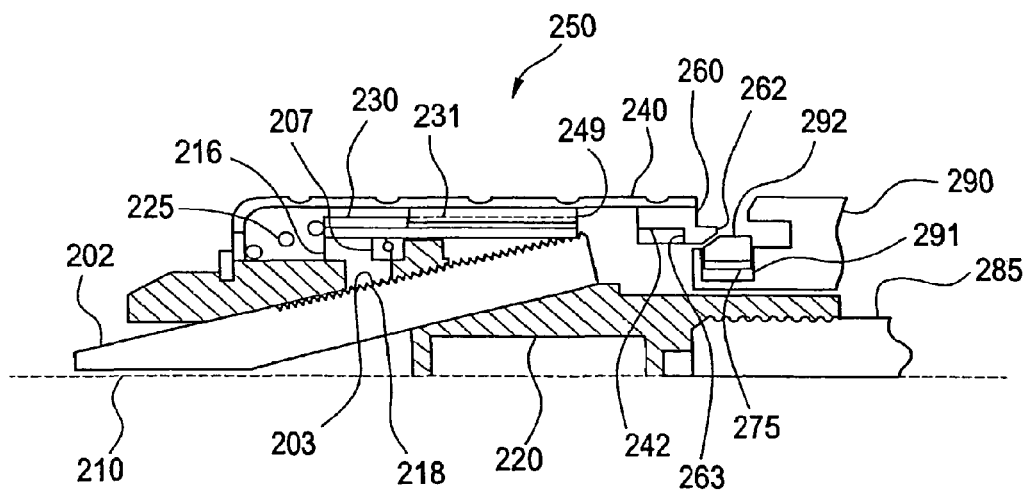
FIG. 10 is a partial schematic illustration of a tool chuck according to another example, non-limiting embodiment of the present invention.

A. The Structure:

With reference to FIG. 10, the tool chuck 250 may include a chuck body 220. The rear end of the chuck body 220 may be fixedly mounted on a spindle 285 of a power driver. The forward end of the chuck body 220 may have passageways that slidably support a plurality of chuck jaws 202. The chuck jaws 202 may be inclined so that respective forward ends of the chuck jaws 202 converge toward an axis 210 of the chuck body 220. The chuck jaws 202 may have respective radially outward facing threads 203. The chuck jaws 202 may be actuated (i.e., advanced and/or retracted) via the radially outward facing threads 203 interacting with radially inward facing threads 218 of a nut 216. As in the previous embodiments, it will be appreciated that the invention may be implemented with a variety chuck jaw types (as opposed to the illustrated "threaded" chuck jaws) that may be opened and closed through a relative rotation between tool chuck parts.

The chuck body 220 may support an inner sleeve 230 and an outer sleeve 240. The inner sleeve 230 and the outer sleeve 240 may be coupled together so that the outer sleeve 240 is axially moveable relative to the inner sleeve 230 and rotationally fixed to the inner sleeve 230. By way of example only, and not as a limitation of the invention, the inner sleeve 230 may include a longitudinal spline 231 that is received by a cooperating feature 249 provided on the outer sleeve 240. It will be appreciated that numerous and varied couplings between the inner and the outer sleeves may be suitably implemented as is well known in this art.

The inner sleeve 230 may be supported so that it is axially fixed to the chuck body 220 and rotatable relative to the chuck body 220. The inner sleeve 230 may fixedly carry the nut 216. A bearing 207 may be interposed between the nut 216 and the chuck body 220 to facilitate a relative rotation between the nut 216 and the chuck body 220.

The outer sleeve 240 may be supported so that it is axially moveable relative to the chuck body 220 (and thus the inner sleeve 230) between an axial forward position and an axial rearward position. In FIG. 10, the tool chuck 250 is illustrated with the outer sleeve 240 in the axial forward position. A compression spring 225 may be captured between the inner sleeve 230 and the outer sleeve 240. The compression spring 225 may influence the outer sleeve 240 to the axial forward position.

As will be discussed in more detail below, a clutch mechanism (inclusive of two cooperating clutch parts 242, 292) may be provided between the outer sleeve 240 and the housing 290 of the driver. The clutch mechanism may rotationally lock the outer sleeve 240 and the housing 290 together up to a predetermined torque threshold. Once the predetermined torque threshold is reached, the clutch mechanism may give way (or slip) to limit the torque that may be applied during the chuck actuating process.

The rear end of the outer sleeve 240 may support a latch ring 260. The latch ring 260 may have a distal end with a cam surface 262 facing in an axial rearward direction and a stop surface 263 facing in an axial forward direction. The cam surface 262 may be inclined relative to the axis 210, while the stop surface 263 may be perpendicular to the axis 210. The latch ring 260 may also include the clutch part 242.

The housing 290 may support the clutch part 292 that may interact with the clutch part 242 of the outer sleeve 240. The clutch part 292 may be rotationally fixed to the housing 290 and moveable relative to the housing 290 in a radial direction. To this end, the housing 290 may include a pocket 291 in which the clutch part 292 is slidably provided. The clutch part 292 may be biased in a radial outward direction via a spring mechanism 275. The spring mechanism 275 depicted in FIG. 10 may be in the form of a leaf spring, but the invention is not limited in this regard. For example, the spring mechanism may be in the form of a wave plate, a coil spring, an elastomeric member, or some other conventional spring mechanisms may be suitably implemented.

Figure 13:
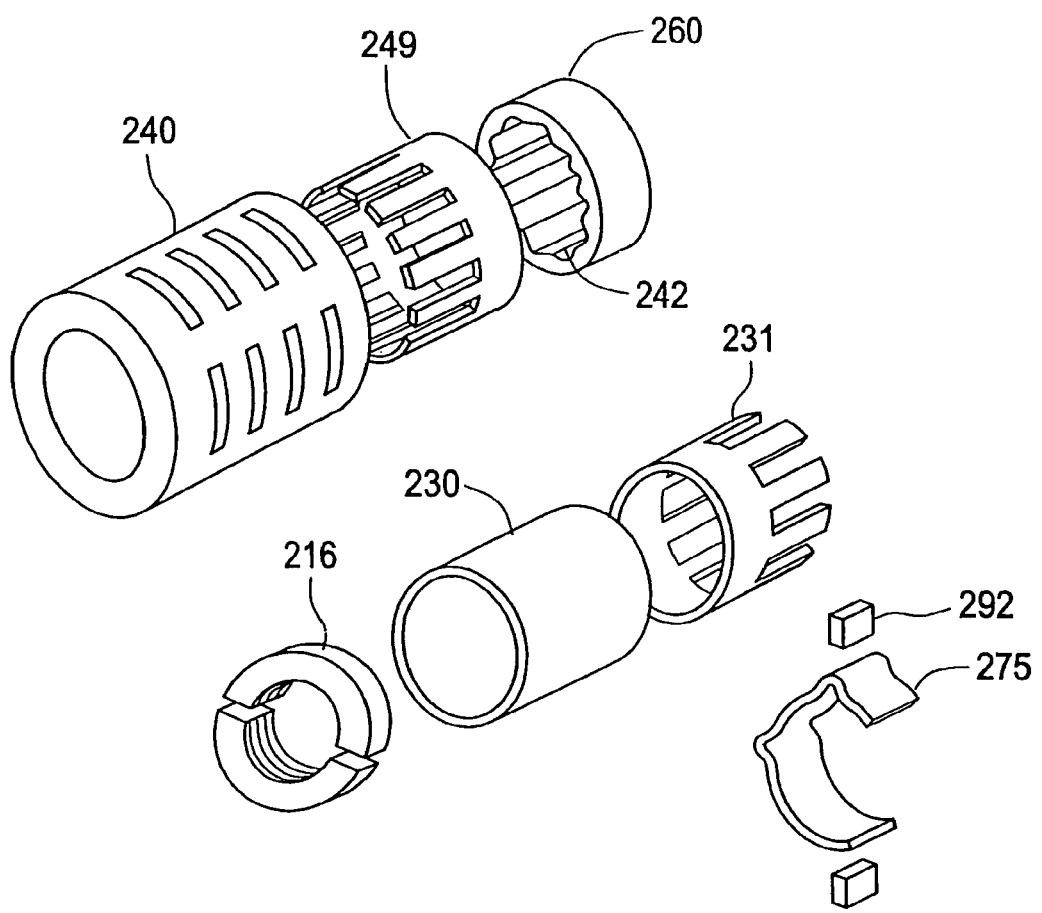
FIG. 13 is an exploded perspective view of example component parts of the tool chuck of FIG. 10.

In this example embodiment, and turning briefly to FIG. 13, the outer sleeve 240, the cooperating feature 249, and the latch ring 260 may be provided as separate and distinct elements, and this may facilitate assembly of the tool chuck 250. However, the invention is not limited in this regard since the outer sleeve 240, the cooperating feature 249, and the latch ring 260 may be of a unitary, one-piece construction. Similarly, the nut 216, the inner sleeve 230, and the spline 231 may be provided as separate and distinct elements, and this may facilitate assembly of the tool chuck 250. However, the invention is not limited in this regard since the nut 216, the inner sleeve 230, and the spline 231 may be of a unitary, one-piece construction.

In this example embodiment, two clutch parts 292 may be mounted on the housing 290. It will be appreciated, however, that the invention is not limited to any specific number of clutch parts 292. For example, a single clutch part 292 (or more than two clutch parts 292) may be suitably implemented. Also, a single spring mechanism 275 may be provided to bias all of the clutch parts 292 in the radial outward direction. It will be appreciated, however, that additional spring mechanisms 275 may be suitably implemented. For example, a spring mechanism 275 may be individually provided for each of the clutch parts 292.

B. The Clutch Mechanism:

The structural and functional aspects of the clutch mechanism will become more apparent with reference to FIGS. 11, 12, 14, and 15, which show example, non-limiting clutch parts that may be suitably implemented in the tool chuck 250 of FIG. 10. In FIGS. 11, 12, 14, and 15, the outer sleeve is depicted in the axial rearward position so that the clutch parts may be operatively engaged. In this condition, one clutch part 292 may be located radially inward of the other clutch part 242. The working surfaces of the clutch parts may face in directions that are perpendicular to the axis 210 of the tool chuck 250.

Figure 11:
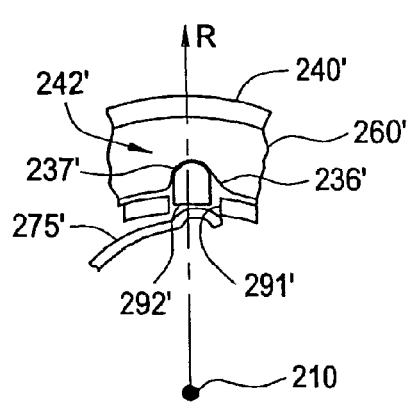
FIGS. 11 and 12 are schematic illustrations of an example clutch mechanism that may be implemented in the tool chuck of FIG. 10.
Figure 12:
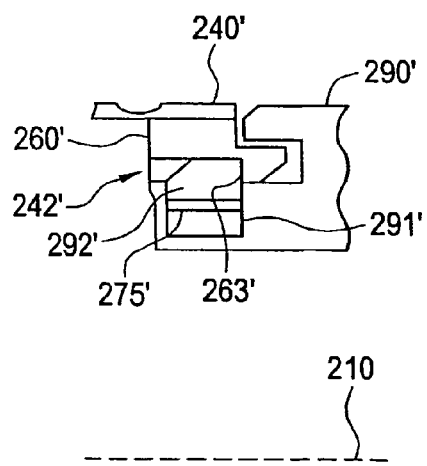

B(1). The Example Clutch Mechanism of FIGS. 11 and 12:

As shown in FIGS. 11 and 12, the clutch part of the outer sleeve 240' may be in the form of a raised feature 242' provided on the latch ring 260'. The raised feature 242' may include two ramps 236', 237'. The clutch part mounted in the housing 290' may be in the form of a detent 292'.

During a chuck actuating process, and when the tool chuck 250 is not fully opened or closed (e.g., while the chuck jaws are still opening or closing), the raised feature 242' may abut against the detent 292' so that the outer sleeve 240' and the housing 290' may be rotationally locked together. When the tool chuck fully closes (with or without an inserted accessory) or fully opens, a rotational force applied by the raised feature 242' to the detent 292' may increase. Here, the rotational force may increase to a threshold at which the detent 292' may be driven in a radial inward direction (and deeper into the pocket 291') against the influence of the spring mechanism 275' so that the raised feature 242' may slide across and past the detent 292'. In this way, the clutch mechanism may give way (or slip), thereby limiting the torque that may be applied during the chuck actuating process.

It will be appreciated that the magnitude of the rotational force necessary to drive the detent 292' in the radial inward direction may be affected by, for example, the strength of the spring mechanism 275' and the degree to which the working surface of the raised feature 242' is inclined (or slanted) relative to the radial reference line R. The smaller the angle between the working surface and the radial reference line R, the greater the rotational force necessary to make the clutch mechanism slip.

As shown in FIG. 11, a working surface of the ramp 236' may be inclined (relative to the radial reference line R) to a greater degree than a working surface of the ramp 237'. In this way, the rotational force (or threshold torque) required to make the clutch mechanism slip in a first direction (i.e., when the detent 292' is driven in the radial inward direction via the working surface of the ramp 236') may be less than the rotational force (or threshold torque) required to make the clutch mechanism slip in a second direction (i.e., when the detent 292' is driven in the radial inward direction via the working surface of the ramp 237'). This threshold torque differential may be suitably implemented so that a predetermined torque threshold for the chuck tightening process may be less than a predetermined threshold for the chuck loosening process.

In this example embodiment, and with reference to FIG. 12, the stop surface 263' of the latch ring 260' may press in an axial forward direction against the axial rear end of the detent 292'. The interaction between the stop surface 263' and the detent 292' may not provide a cam action that would cause the detent 292' to move in the radial inward direction against the influence of the spring mechanism 275'. In this way, the detent 292' may retain the outer sleeve 240' in the axial rearward position (and against the influence of the compression spring 225). The outer sleeve 240' may be axially retained in this fashion until the raised feature 242' slides across the detent 292', thereby driving the detent 292' in a radial inward direction and into the pocket 291'.

Figure 14:
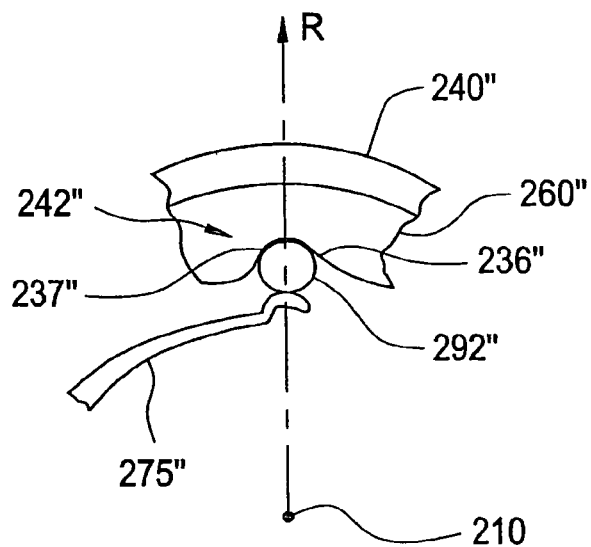
FIGS. 14 and 15 are schematic illustrations of an example clutch mechanism that may be implemented in the tool chuck of FIG. 10.
Figure 15:
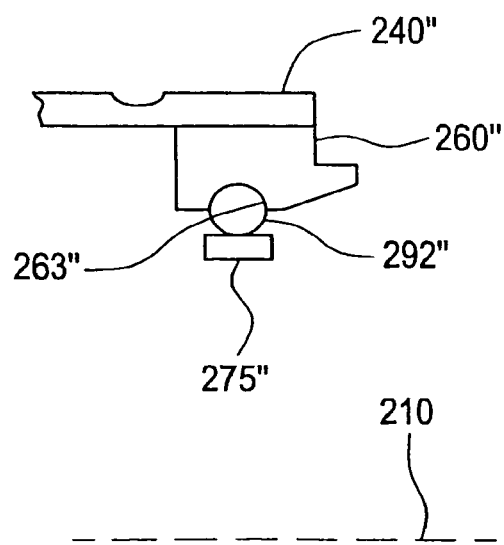

B(2). The Example Clutch Mechanism of FIGS. 14 and 15:

As shown in FIGS. 14 and 15, the clutch part of the outer sleeve 240" may be in the form of a raised feature 242" provided on the latch ring 260". The raised feature 242" may include two ramps 236", 237". The clutch part mounted in the housing may be in the form of a detent 292". The detent 292" may have a spherical shape.

During a chuck actuating process, and when the tool chuck 250 is not fully opened or closed, the raised feature 242" may abut against the detent 292" so that the outer sleeve 240" and the housing may be rotationally locked together. When the tool chuck fully closes or fully opens, a rotational force applied by the raised feature 242" to the detent 292" may increase. Here, the rotational force may increase to a threshold at which the detent 292" may be driven in a radial inward direction against the influence of the spring mechanism 275" so that the raised feature 242" may slide across and past the detent 292". In this way, the clutch mechanism may give way (or slip), thereby limiting the torque that may be applied during the chuck actuating process.

As shown in FIG. 14, a working surface of the ramp 236" may be inclined (relative to the radial reference line R) to a greater degree than a working surface of the ramp 237". In this way, the rotational force (or threshold torque) required to make the clutch mechanism slip in a first direction (i.e., when the detent 292" is driven in the radial inward direction via the working surface of the ramp 236") may be less than the rotational force (or threshold torque) required to make the clutch mechanism slip in a second direction (i.e., when the detent 292" is driven in the radial inward direction via the working surface of the ramp 237"). This threshold torque differential may be suitably implemented so that a predetermined torque threshold for the chuck tightening process may be less than a predetermined threshold for the chuck loosening process.

In this example embodiment, and with reference to FIG. 15, the stop surface 263" of the latch ring 260" may be contiguous with the ramps 236", 237" of the raised feature 242". For example, the latch ring 260" may be provided with a groove that defines the ramps 236", 237" and the stop surface 263". Here, a radial inward facing wall of the groove may define the ramps 236", 237", while an axial forward facing wall of the groove may define the stop surface 263". In FIG. 15, the groove may extend into the plane of the drawing sheet.

The stop surface 263" may press in an axial forward direction against the axial rear end of the detent 292". The interaction between the stop surface 263" and the detent 292" may not provide a cam action that would cause the detent 292" to move in the radial inward direction against the influence of the spring mechanism 275". In this way, the detent 292" may retain the outer sleeve 240" in the axial rearward position (and against the influence of the compression spring 225). The outer sleeve 240" may be axially retained in this fashion until the raised feature 242" slides across the detent 292", thereby driving the detent 292" in a radial inward direction.

C. The Operation:

The tool chuck 250 may operate differently depending on the axial position of the outer sleeve 240.

When the outer sleeve 240 is in the axial forward position, as shown in FIG. 10, the power driver may be operated in a normal operating mode. Here, the outer sleeve 240 may be rotatable relative to the housing 290 since the clutch parts 242, 292 may be disengaged (i.e., the clutch mechanism is inactive).

When the driver is powered up, the spindle 285 may rotationally drive the chuck body 220, which in turn may rotationally drive the chuck jaws 202. The chuck jaws 202 may rotate together with the nut 216, the inner sleeve 230, and the outer sleeve 240. Thus, the entire tool chuck 250 may rotate together as a single unit.

To achieve a chuck actuating mode, an operator may push the outer sleeve 240 to the axial rearward position and with sufficient force to compress the spring 225. As the outer sleeve 240 moves in the axial rearward direction (relative to the inner sleeve 230, the chuck body 220, and the housing 290), the cam surface 262 of the latch ring 260 may slide over the clutch part 292, thereby driving the clutch part 292 in the radial inward direction against the influence of the spring mechanism 275. Eventually, the stop surface 263 of the latch ring 260 may move in the axial rearward direction beyond the clutch part 292. At this time, the spring mechanism 275 may drive the clutch part 292 in the radial outward direction and into engagement with the clutch part 242 (as shown in FIG. 12 or FIG. 15).

When the clutch parts 292, 242 engage, the operator may release the outer sleeve 240. The outer sleeve 240 may remain in the axial rearward position by virtue of the clutch part 292 abutting against the stop surface 263 of the latch ring 260. In this condition, the outer sleeve 240 and the housing 290 may be rotationally locked together up to a predetermined torque threshold via the engagement of and interaction between the clutch parts 242, 292 (i.e., the clutch mechanism is active).

When the driver is powered up, the spindle 285 may rotationally drive the chuck body 220, which may rotate together with the chuck jaws 202. The chuck body 220 (and thus the chuck jaws 202) may rotate relative to the nut 216 and the inner sleeve 230. This is because the inner sleeve 230 may remain rotationally locked to the outer sleeve 240 (via the spline 231 and the cooperating feature 249), which in turn may remain rotationally locked to the housing 290 (via the clutch mechanism). The relative rotation between the nut 216 and the chuck body 220 (and thus the chuck jaws 202) may drive the chuck jaws 202 opened or closed (depending on the rotation direction of the spindle 285).

As the tool chuck 250 reaches a fully opened or closed position, the nut 216 may become tightened onto the chuck jaws 202. At this time, increased rotational forces may be transmitted from the chuck body 220 (and the chuck jaws 202), through the nut 216 and the inner sleeve 230, and to the clutch part 242. The rotational force may increase to a threshold at which the clutch mechanism may give way (or slip). In this way, the clutch mechanism may limit the torque that may be applied during the chuck actuating process.

It will be appreciated that the driver may be powered up in opposite rotational directions to respectively tighten or loosen the tool chuck 250. Accordingly, as in the previous embodiments, a predetermined torque threshold for the chuck tightening process may be less than a predetermined torque threshold for the chuck loosening process.

When the clutch mechanism slips, the outer sleeve 240 (and thus the latch ring 260) may rotate relative to the housing 290. During this relative rotation, the clutch part 292 may be driven in the radial inward direction (via the clutch part 242). The clutch part 292 may separate from the stop surface 263 so that the spring 225 may return the outer sleeve 240 to the forward axial position. This may give the operator an audible and visual indication that the chuck actuating process is complete.

IV. Example Embodiment Depicted in FIG. 16

FIG. 16 depicts another example, non-limiting embodiment of a tool chuck 350 that may be provided on a power driver 800. As in the previous embodiments, the tool chuck 350 may include a clutch mechanism and a sleeve 340 that may be axially positioned to achieve different operating modes (e.g., a normal operating mode and a chuck actuating mode).

As shown in FIG. 16, a link 600 may be provided between the sleeve 340 and an on-off switch 700. The link 600 may be mounted for axial movement on the power driver housing. The link 600 may extend into a recess 500 provided in the sleeve 340. When the driver 800 is powered up in the normal operating mode, the link 600 may slide through the recess 500.

By virtue of the link 600, the motor of the power driver 800 may be switched on when an operator moves the sleeve 340 axially to engage the clutch mechanism (to achieve the chuck actuating mode). Conversely, when the clutch mechanism releases at a predetermined torque threshold, the sleeve 340 (and thus the link 600) may return to the initial axial position so that the motor may be switched off.

Several example clutch mechanism have been described above. The invention is not, however, limited to the specific details of the disclosed examples. Numerous and varied modifications of the clutch mechanisms may become readily apparent to those skilled in the art. A few modifications are noted below.

First, the respective locations of the cooperating clutch parts may be reversed. For example, and with respect to the clutch mechanisms depicted in FIGS. 2-4, the clutch parts provided on the front sleeve may instead be provided on the rear sleeve, and the clutch parts provided on the rear sleeve may instead be provided on the front sleeve. Similarly, and with respect to the clutch mechanisms depicted in FIGS. 7-9, 11, 12, 14, and 15, the clutch parts provided on the rear sleeve (or outer sleeve) may instead be provided on the housing, and the clutch parts provided on the housing may instead be provided on the rear sleeve (or outer sleeve).

Second, the clutch parts are not limited to the specific geometrical shapes illustrated in FIGS. 2-4, 7-9, 11, 12, 14, and 15. In this regard, numerous and alternative shapes may be implemented. For example, the clutch parts may have symmetrical or asymmetrical shapes. The working surfaces of the clutch parts may be planar and/or curved. The cooperating clutch parts may have working surfaces with complementary profiles or different profiles.

Third, the invention is not limited to a specific number of clutch part elements. For example, a clutch part may include one or more detents, arms, raised features, etc. When a clutch part includes more than one clutch part element, it may be desirable to uniformly space the clutch part elements around the axis of the tool chuck, but the invention is not limited in this regard. Also, the number of clutch part elements of one clutch part may or may not equal the number of clutch part element of the cooperating clutch part.

What is claimed is:

1. A power driver including a tool chuck, the power driver comprising:
 a chuck body defining a longitudinal axis;
 a sleeve mounted directly on the chuck body for movement between a first axial position and a second axial position;
 a switch for switching on a motor of the power driver;
 a link between the sleeve and the switch; and
 wherein moving the sleeve into the second position, switches on the motor of the power driver.

2. The power driver of claim 1, wherein moving the sleeve into the second position engages a clutch mechanism.

3. The power driver of claim 2, wherein the clutch mechanism limits the amount of torque that can be applied during the chuck actuation process.

4. The power driver of claim 2, wherein when the sleeve moves from a second axial position to a first axial position, the clutch and the motor are disengaged.

5. The power driver of claim 1, wherein switching on the motor causes relative movement between the chuck body and the sleeve to achieve a chuck actuation mode.

6. The power driver of claim 1, wherein when the sleeve moves from a second axial position to a first axial position, the motor is switched off.

7. A power driver including a tool chuck, the power driver comprising:

a chuck body defining a longitudinal axis;
a first sleeve mounted on the chuck body;
a second sleeve mounted on the chuck body, the second sleeve supporting a clutch part, the second sleeve being moveable relative to the first sleeve between a first axial position in which the first and the second sleeves are rotatable with the chuck body, a second axial position in which the clutch part engages with a cooperating clutch part; and a spring that biases the second sleeve toward the first axial position, wherein the spring is captured between the chuck body and the second sleeve;
a switch for switching on a motor of the power driver;
a link between the second sleeve and the switch; and
wherein moving the second sleeve into the second position, switches on the motor of the power driver.

8. A power driver having a tool chuck, the power driver comprising:

a chuck body;
a sleeve mounted directly on the chuck body for movement between a first axial position and a second axial position;
a clutch part provided on the sleeve;
a switch for switching on a motor of the power driver;
a link between the sleeve and the switch;
wherein, when the sleeve is in the second axial position the clutch part engages with a cooperating clutch part, and the clutch part and the cooperating clutch part are movable relative to each other in a radial direction to limit torque applied during a chuck actuating process; and
wherein moving the sleeve into the second position, switches on the motor of the power driver.

* * * * *